Aug. 26, 1947.   T. A. WOOLSEY   2,426,423
HYDRAULIC COUPLING
Filed Feb. 21, 1945
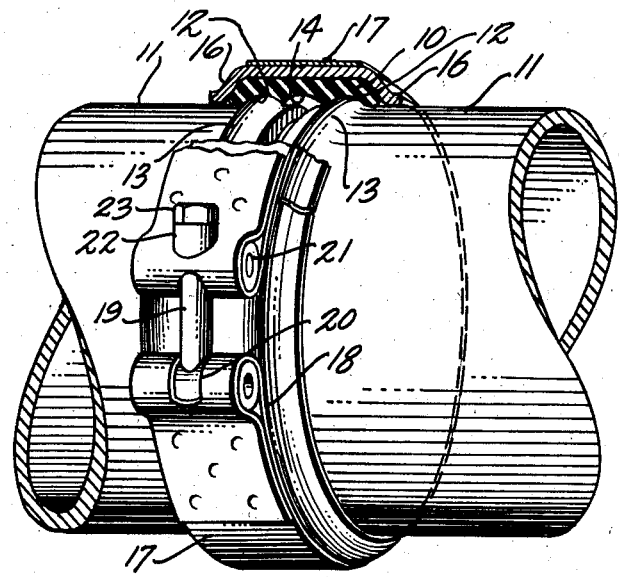
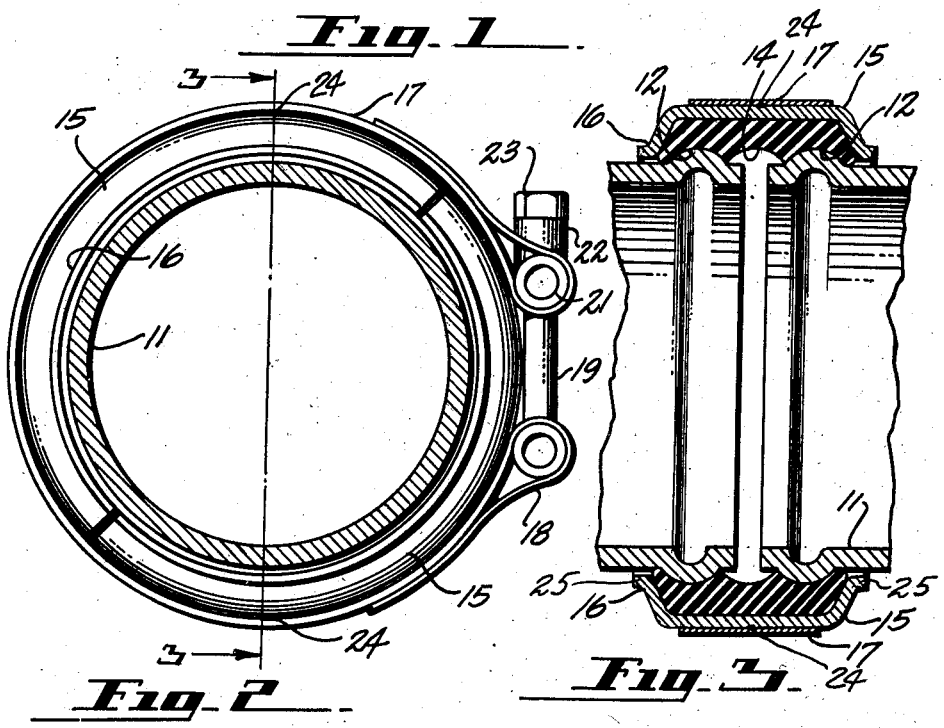
THEODORE A. WOOLSEY
  INVENTOR.
BY Edwin Coates
  ATTORNEY Patented Aug. 26, 1947

2,426,423

UNITED STATES PATENT OFFICE 2,426,423

HYDRAULIC COUPLING

Theodore A. Woolsey, Pasadena, Calif., assignor to Marman Products Company, Inc., Inglewood, Calif.

Application February 21, 1945, Serial No. 579,094

17 Claims. (Cl. 285—129)

This invention relates to coupling devices, more particularly to a device for connecting together the abutting ends of conduits or pipes adapted to carry fluid under pressure.

The device of the present invention in the broadest aspects thereof comprises a ring of some suitable resilient material, a pair of rigid semi-annular segments, or shoes, provided with coextensive flanges at the opposite edges thereof which form therebetween a channel for receiving the ring, and a band of flexible material adapted to be clamped about the segments.

In the preferred form of the coupling device herein shown each segment is connected to the band by spot welding selected points on each segment or shoe to the band. To facilitate use of the device, the segments are so connected to the band that in use the latter can be flexed to separate the segments and permit the same to be disposed about the ring previously mounted on the adjacent ends of the conduits to be joined.

The coupling device herein shown is intended to be used with conduits or tubes in which beads are formed adjacent the ends to be connected by the coupling device. The beads, besides their usual function, cooperate with the coupling device to hold the conduits against separation. To this end the ring is formed with two circumferential grooves for receiving the beads of the conduits. As the inside diameter of the flanges is less than the outside diameter of the beads, the wedging of the material of the ring between the flanges and the beads, after the band has been tightened about the segments, or shoes prevents the ends of the conduits from separating a distance sufficient to destroy the connection.

The coupling device of the present invention is well adapted to be used in hydraulic systems where relatively high pressures are encountered. To utilize the high pressure to augment the sealing action the inner surface of the ring is formed with a centrally located circumferential groove forming an annular chamber communicating with the pressure in the conduits. Thus the pressure within the conduits acts against the wall of the chamber and deforms the material of the ring and forces or urges the material into the annular opening between the edges of the flanges and the conduits as well as into good sealing engagement with the conduits adjacent the flanges.

The segments are formed of relatively rigid material so that there is little likelihood of the flanges bending or deforming under the stresses produced by the pressure within the conduits joined. However, to strengthen the flanges, and particularly the free edge portions thereof, the latter are formed with outwardly projecting ribs. The ribs strengthen the flanges as well as eliminate any sharp corners which might cleave the material of the ring as it is urged against the flanges.

Although the coupling device is formed of the two segments and the clamping band, the connection between the segments and the band makes the device capable of being handled as a one-piece coupling. The coupling device of the present invention, however, is not subject to the criticism of many of the previously proposed one-piece couplings, for the device may be made of a strength sufficient to withstand the pressures to be expected to be encountered and yet is easily opened to permit the same to be disposed about the conduits to be joined. This is due to the particular construction of applicant's device, as the clamping band is sufficiently flexible to allow the same to serve as a hinge in the installing operation.

Other features and advantages of the present invention will be apparent from the following description taken in connection with the accompanying drawing in which:

Figure 1 is a perspective view of the coupling of the present invention shown mounted to a pair of conduits with a portion of the coupling device removed for more clearly illustrating the same;

Figure 2 is a side view of the coupling device mounted in place on the conduits with the conduits being shown in section; and Figure 3 is a section taken along line 3—3 of Figure 2.

The coupling device of the present invention, referring now to the drawing and particularly Figure 1 thereof, comprises a packing ring 10 of some suitable material such as rubber, neoprene, or a similar material which will not be affected by the fluid in the conduits 11 between which it is placed.

The coupling device is preferably used to join conduits formed with beads adjacent the ends thereof, and to this end the interior surface of the ring is formed with three spaced annular grooves, the outer two, each designated by the reference character 12, receiving respectively an annular bead 13 formed adjacent the end of each conduit 11.

It will be seen, referring now to Figure 2, that the outer grooves are so spaced that when the beads 13 of the conduits are seated therein the adjacent ends of the conduits are spaced apart to provide an annular passage leading to the chamber formed by the intermediate groove 14 of the ring 10. Thus the chamber so formed is in communication with the material of the conduits and the wall of the same will be subjected to the pressure of the fluids in the conduits.

To hold the ring 10 about the ends of the conduits a pair of semi-annular segments or shoes 15 are placed on opposite sides of the ring. Each segment or shoe is formed at opposite sides thereof with inwardly and laterally extending flanges 16 coextensive therewith. The segments 15, together with the flanges 16, when placed as best shown in Figures 1 and 3 form an annular groove for receiving and confining the ring 10.

The segments 15 are held about the ring 10 by a clamping band 17 formed of some relatively flexible material such as stainless steel. Each end of the band is bent back on itself and spot-welded to form a loop 18. The one loop is formed about the head of a T bolt 19, the shank of which projects through a slot 20 formed in the portion of the band of which the loop is formed.

A cylindrical member 21 is mounted in the other loop and is formed with a transversely extending passage to be aligned with openings in this loop to permit the threaded end of the shank of the bolt 19 to extend therethrough. A bushing 22, slipped over the projecting end of the shank extends through the one opening and seats on the member 21 to take the thrust of a nut 23 threaded onto the end of the shank. It will be seen that as the nut 23 is tightened the ends of the band are drawn together to clamp the segments 15 about the ring 10. To prevent accidental movement of the segments caused by pressure acting against the ring, the band should cover both lines of jointure between the two segments.

Although the segments need not be connected to the band, in the preferred form of the device, each segment is rigidly fixed to the band. This facilitates use of the device and eliminates the necessity of holding the segments about the ring as the band is mounted in place. Any means desired may be used to connect the segments to the band, but in the illustrated embodiment of the invention each segment 16 is spot-welded as shown at 24 to the band 17 at substantially diametrically opposite points thereon.

It will be noted that, although the band covers both lines of jointure between adjacent ends of the segments, the welds 24 are so located that the opposite ends of the band may be drawn apart to separate the segments to permit the same to be placed about the ring 10 after it has been mounted to the adjacent ends of the conduits to be joined. The band 17, as it is formed of a relatively flexible material, acts as a spring-loaded hinge in this operation, for it normally tends to hold the segments together.

The flexibility of the material of the band eliminates the danger of deforming the coupling device as it is spread apart before it is mounted about the packing ring 10 and also allows the band to be tightly clamped about the segments as the nut is tightened on the bolt 18.

The coupling device of the present invention is not intended to be used as an adjustable or universal device, and each device will be used only with conduits of the diameter which the device was designed to be used. The segments therefore will be of such a size that the end faces thereof will be brought into close proximity, if not in contact, when the band is tightened to clamp the segments about the ring.

The ring 10 should be of such a thickness that the flanges 16 will be held out of engagement with the conduits 11 even after the band 17 has been tightly clamped about the segments 15 to compress the ring 10 between the latter and the conduits. In the preferred embodiment of the coupling device, the ring 10 is of such a size relative to the size of the flanges 16 that the inner diameter of the latter, after the band has been tightened, is less than the outer diameter of the beads 13. Thus, as the material of the ring 10 will be compressed and wedged between the beads 13 and the flanges 16 as the band 17 is tightened, any outward movement of the conduits will be resisted by the material confined by the segments and the flanges thereof. Even if some portion of the material of the ring should "flow" into the chamber formed by the groove 14 during relative outward movement of the conduits, the flanges of the segments will prevent the conduits from separating a distance sufficient to destroy the connection. It will be obvious that the inner edges of the flanges must not only be spaced from the conduits a distance less than the height of the beads but the distance must be small enough to prevent the material of the ring from extruding through the annular opening between the conduits and the flanges as a result of the compressive load on the material.

The circumferential compression of the material of the ring between the segments 15 and their flanges 16 and the conduits 11 effects a fluid-tight seal between the ring and the adjacent ends of the conduits. As the wall of the chamber formed by the groove 14 is subjected to the pressure of the fluid within the conduits, the seal between the ring and the conduits is increased as the pressure within the conduits increases. This is due to the increased compression of the material of the ring between the segments and the outer surface of the conduits caused by the increase of the pressure within the conduits.

The compression of the material of the ring between the flanges and the conduits subjects the flanges to relatively high bending stresses and the segments should be formed of relatively rigid material and of a strength sufficient to resist the bending forces to which the flanges are subjected.

To further strengthen the flanges, the inner or free edge portions thereof are formed with out-turned ribs 25. The ribs not only strengthen the flanges but also eliminate any sharp corners which might cut the material of the ring 10 as it is compressed between the flanges 16 and the conduits 11.

Although the segments are formed of relatively heavy rigid stock no difficulty is experienced in mounting the coupling device to the conduits to be joined, as the band will easily open a distance sufficient to permit the segments to be disposed about the ring 10.

Thus the coupling device of the present invention obviates the problem usually inherent in prior one-piece clamps of sacrificing strength to afford sufficient resilience to allow the coupling device to be opened when it is to be mounted about the packing ring. The device herein shown is easier to apply than many multiple-piece couplings and is equal in strength. A further advantage of the device of this invention is that the same can be clamped in place without the use of special tools.

Although the now preferred embodiment of the present invention has been shown and described herein, it is to be understood that the invention is not to be limited thereto for it is susceptible to changes in form and detail within the scope of the appended claims.

I claim:

1. A coupling device adapted to connect together the adjoining ends of two conduits comprising: an annular member of resilient compressible material to be mounted on the adjoining ends of the said conduits; rigid arcuate members to be placed on opposite sides of said member for partially circumscribing and confining said member; a flexible member encircling said members and attached thereto at spaced points; and means for contracting said flexible member about said means whereby said means are drawn together to encompass the material of said annular member and compress the same.

2. A coupling device as claimed in claim 1 in which the opening between the ends of said flexible member is circumferentially spaced from the ends of said rigid arcuate members.

3. A coupling device adapted to connect together the ends of two conduits comprising: a packing ring adapted to encircle the adjacent ends of said conduits; a pair of arcuate segments of rigid material adapted to be placed about said ring; flanges carried by said segments and forming therewith an annular channel for receiving said ring; and a flexible clamping band encircling said segments, each segment being attached to said band at substantially diametrically opposite points on the same.

4. A coupling device adapted to connect together the ends of two conduits comprising: a packing ring adapted to encircle the adjacent ends of said conduits; a pair of rigid relatively heavy arcuate segments having a substantially channel-shaped cross section adapted to be placed on opposite sides of said ring to confine the same; a flexible relatively light band encircling said segments and attached to the same; and means for contracting said band to draw said segments together and compress said packing ring.

5. A coupling device adapted to connect together the ends of two conduits comprising: a packing ring adapted to encircle the adjacent ends of said conduits; a flexible band coiled to a substantially circular form; a pair of rigid arcuate segments each attached to said band at substantially diametrically opposite points; flanges inwardly directed from opposite edges of said segments and forming therewith a channel adapted to receive said ring; and means for contracting said band to draw said segments together and compress said packing ring.

6. A coupling device adapted to connect together the ends of two conduits comprising: a packing ring adapted to encircle the adjacent ends of said conduits; a pair of rigid segments encircling said ring and having inwardly directed flanges engaging the opposite edge faces of said ring; and a single means attached to both of said segments for drawing the same together to compress said ring about the ends of said conduits, said means being so constructed and arranged that said segments may be drawn apart a distance sufficient to permit the same to be slipped over said ring.

7. A coupling device adapted to connect together the ends of two conduits comprising: a packing ring adapted to encircle the adjacent ends of said conduits; a pair of arcuate rigid segments, each having inturned flanges, said segments adapted to be placed on opposite sides of said ring; a relatively flexible band encircling said segments; and means for attaching each segment at substantially diametrically spaced points on said band.

8. A coupling device adapted to connect together the ends of two conduits comprising: a packing ring adapted to encircle the adjacent ends of said conduits; a pair of arcuate rigid segments, each having inturned flanges, said segments adapted to be placed on opposite sides of said ring; ribs formed on the inner edge portions of said flanges for reinforcing the same; a relatively flexible band encircling said segments; and means for attaching each segment at spaced points on said band, the segments being so attached to said band that the same will be drawn apart when the ends of the band are separated.

9. A coupling device for joining the adjacent ends of a pair of conduits comprising: a packing ring adapted to encircle the adjoining ends of said conduits; a band formed of a single length of flexible metal curved to a circular shape; and a pair of semi-circular shoes fixed to said band at opposite points on the same, the metal of said band being sufficiently flexible to permit said band to be opened to draw said shoes apart a distance greater than the outer diameter of said ring.

10. A coupling device for joining the adjacent ends of a pair of conduits comprising: a packing ring adapted to encircle the adjoining ends of said conduits; a band formed of a single length of flexible metal curved to a circular shape; a pair of semi-circular shoes fixed to said band at diametrically opposite points on the same; flanges inwardly extending from opposite edges of each shoe and forming therewith an arcuately-shaped channel for receiving a part of said ring; and ribs formed on the inner edges of said flanges for reinforcing the same, the metal of said band being sufficiently flexible to permit said band to be opened to draw said flanged shoes apart a distance greater than the outer diameter of said ring.

11. A coupling adapted to connect together the ends of a pair of conduits having annular beads adjacent the ends thereof comprising: a ring of resilient compressible material encircling the adjoining ends of said conduits with the beads thereof disposed in annular grooves formed in the interior surface of said ring; a band formed of a single length of flexible metal curved to a circular shape; a pair of semi-circular rigid shoes attached to the inner surface of said band at diametrically opposite points on the same; flanges inwardly extending from the opposite edges of each shoe, said flanged shoes when disposed on opposite sides of said conduits at the jointure therebetween forming an annular recess for receiving said ring; and means for drawing the ends of said band together to clamp said shoes about said ring, the band being sufficiently flexible to be opened to draw the inner edge portions of said flanges apart a distance greater than the outer diameter of said ring whereby said flanges can be passed over the ring to dispose the shoes about the same.

12. A coupling device for joining the adjacent ends of a pair of conduits comprising: a packing ring adapted to encircle the adjoining ends of said conduits; a band formed of a single length of flexible metal curved to a circular shape; a pair of semi-circular shoes fixed to said band at diametrically opposite points on the same, flanges inwardly extending from opposite edges of each shoe and forming therewith an arcuately-shaped channel for receiving a part of said ring; outwardly extending ribs formed on the inner edges of said flanges for reinforcing the same; and means for drawing the ends of said band together to circumferentially compress the ring between said conduits and the flanged shoes.

13. In combination with a pair of conduits having annular beads adjacent the ends thereof: a packing ring encircling the adjoining ends of said conduits with the beads thereof disposed in annular grooves formed in the interior surface of said ring; a pair of arcuate segments substantially channel-shape in cross section disposed on opposite sides of said ring with the flanges thereof extending inwardly in engagement with the opposite edge faces of said ring; and means for drawing the segments together to compress said ring, said ring being of such a size relative to the size of said flanges that the inner diameter of the latter when said ring is compressed is less than the outer diameter of said beads.

14. In combination with a pair of conduits: a pair of rigid segments each formed with a semi-annular recess in its inner surface whereby said segments when brought into juxtaposition form an annular recess; a packing ring disposed in said annular recess and encircling the adjacent ends of said conduits; a flexible band circumscribing said segments and attached to each segment at substantially diametrically opposite points; and means contracting said band about said segments and compressing the ring encircling the ends of said conduits.

15. In combination with a pair of conduits having annular beads adjacent the ends thereof: a packing ring encircling the adjoining ends of said conduits with the beads thereof disposed in annular grooves formed in the interior surface of said ring; a pair of arcuate segments substantially channel-shape in cross section disposed on opposite sides of said ring with the flanges thereof extending inwardly in engagement with the opposite edge faces of said ring; ribs formed at the free edges of said flanges for reinforcing the same; and means for drawing the segments together to compress said ring, said ring being of such a size relative to the size of said flanges that the inner diameter of the latter when said ring is compressed is less than the outer diameter of said beads.

16. In combination with a pair of conduits having annular beads adjacent the ends thereof: a packing ring encircling the adjoining ends of said conduits with the beads thereof disposed in annular grooves formed in the interior surface of said ring; a pair of arcuate segments substantially channel-shape in cross section disposed on opposite sides of said ring and substantially confining the same; ribs formed at the free edges of the flanges of said segments for reinforcing said flanges against bending forces; and means for drawing the segments together to compress said ring, said ring being so compressible and of such a size relative to the size of said flanges that after said ring has been compressed the ribs are in close proximity to the outer surface of said conduits and spaced therefrom a distance less than the height of said beads.

17. In combination with a pair of conduits having annular beads adjacent the ends thereof: a packing ring encircling the adjoining ends of said conduits with the beads thereof disposed in annular grooves formed in the interior surface of said ring; a groove formed in the interior surface of said ring intermediate said bead-receiving grooves forming an annular chamber communicating with the interior of said conduits through the adjoining ends thereof; a pair of arcuate segments substantially channel-shape in cross-section disposed on opposite sides of said ring with the flanges thereof extending inwardly in engagement with the opposite edge faces of said ring; and means for drawing the segments together to circumferentially compress said ring between the same and said conduits, pressure within said conduits acting against the wall of said chamber increasing the circumferential compression of said ring, and augmenting the seal effected by the compression of said ring.

THEODORE A. WOOLSEY.

REFERENCES CITED

The following references are of record in the file of this patent:

UNITED STATES PATENTS

| Number | Name | Date |
|---|---|---|
| 2,323,823 | Markey | July 6, 1943 |
| 2,267,533 | O'Brien | Dec. 23, 1941 |

FOREIGN PATENTS

| Number | Country | Date |
|---|---|---|
| 34,635 | Germany | July 12, 1885 |

Disclaimer 2,426,423.—*Theodore A. Woolsey*, Pasadena, Calif. HYDRAULIC COUPLING. Patent dated Aug. 26, 1947. Disclaimer filed Jan. 23, 1948, by the inventor; the assignee, *Marman Products Company, Inc.*, assenting.

Hereby enters this disclaimer to claims 13 and 17 of said patent.

[*Official Gazette Mar. 2, 1948.*]